United States Patent
Choi et al.

(10) Patent No.: US 8,782,717 B2
(45) Date of Patent: Jul. 15, 2014

(54) METHOD OF RESTORING AV SESSION AND A CONTROL POINT FOR THE SAME

(75) Inventors: Sang-hoon Choi, Dongjak-gu (KR); Joon-ho Cho, Suwon-si (KR); Hyun-sik Yoon, Songpa-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 839 days.

(21) Appl. No.: 11/656,374

(22) Filed: Jan. 23, 2007

(65) Prior Publication Data

US 2007/0189733 A1 Aug. 16, 2007

(30) Foreign Application Priority Data

Jan. 31, 2006 (KR) .................. 10-2006-0009343

(51) Int. Cl.
*H04N 7/18* (2006.01)

(52) U.S. Cl.
USPC .................................................. 725/81

(58) Field of Classification Search
CPC .................. H04N 21/2402; H04N 21/43615; H04N 7/106; H04N 21/4425
USPC ............ 725/80–85, 100, 131, 139, 151
See application file for complete search history.

(56) References Cited

U.S. PATENT DOCUMENTS

| | | | |
|---|---|---|---|
| 6,597,857 B1 * | 7/2003 | Clapper | 386/46 |
| 6,681,396 B1 * | 1/2004 | Bates et al. | 725/58 |
| 6,686,838 B1 | 2/2004 | Rezvani et al. | |
| 7,120,822 B2 * | 10/2006 | Lin | 714/6 |
| 2002/0078161 A1 | 6/2002 | Cheng | |
| 2002/0165987 A1 * | 11/2002 | Arisaka et al. | 709/246 |
| 2003/0204857 A1 * | 10/2003 | Dinwiddie et al. | 725/134 |
| 2004/0010561 A1 | 1/2004 | Kim et al. | |
| 2004/0068746 A1 * | 4/2004 | Mori et al. | 725/88 |
| 2004/0243700 A1 | 12/2004 | Weast | |
| 2005/0081242 A1 * | 4/2005 | Kwok | 725/58 |
| 2005/0149629 A1 * | 7/2005 | Kidd et al. | 709/224 |
| 2005/0246622 A1 | 11/2005 | Ahn et al. | |
| 2005/0286417 A1 * | 12/2005 | An et al. | 370/229 |
| 2006/0056449 A1 * | 3/2006 | Morioka | 370/466 |
| 2006/0089981 A1 * | 4/2006 | Ahn et al. | 709/221 |
| 2006/0155858 A1 * | 7/2006 | Kim | 709/227 |
| 2006/0161635 A1 * | 7/2006 | Lamkin et al. | 709/217 |
| 2007/0033286 A1 * | 2/2007 | Min | 709/228 |
| 2007/0033292 A1 * | 2/2007 | Sull et al. | 709/238 |

(Continued)

FOREIGN PATENT DOCUMENTS

| | | |
|---|---|---|
| EP | 1 300 989 A1 | 4/2003 |
| JP | 2003-46535 A | 2/2003 |

(Continued)

OTHER PUBLICATIONS

AVTransport: 1 Service Template Version 1.01, Standardized DCP, Jun. 25, 2002, pp. 1-66.*

(Continued)

*Primary Examiner* — Nathan Flynn
*Assistant Examiner* — Alfonso Castro
(74) *Attorney, Agent, or Firm* — Sughrue Mion, PLLC

(57) ABSTRACT

An AV session restoration method and a control point for performing the same are provided. The method includes collecting AV session information, and restoring the AV session based on the collected AV session information when an error occurs in the AV session.

26 Claims, 8 Drawing Sheets

(56) References Cited

U.S. PATENT DOCUMENTS

| | | | |
|---|---|---|---|
| 2007/0056013 A1* | 3/2007 | Duncan | 725/134 |
| 2007/0192445 A1* | 8/2007 | Lord et al. | 709/219 |
| 2008/0201754 A1* | 8/2008 | Arling et al. | 725/114 |
| 2008/0288618 A1* | 11/2008 | Vardi et al. | 709/223 |

FOREIGN PATENT DOCUMENTS

| | | |
|---|---|---|
| JP | 2005-020180 A | 1/2005 |
| JP | 2005-318250 A | 11/2005 |
| JP | 2005-323068 A | 11/2005 |
| KR | 10-2004-0013465 A | 2/2004 |
| KR | 10-2004-0104345 A | 12/2004 |
| KR | 10-2004-0104347 A | 12/2004 |
| KR | 1020050062849 | 6/2005 |
| KR | 10-2005-0077672 A | 8/2005 |
| KR | 1020060001554 A | 1/2006 |
| WO | 2005/029770 A1 | 3/2005 |
| WO | WO 2005029770 A1 * | 3/2005 |

OTHER PUBLICATIONS

UPnP AV Architecture:0.83, Preliminary Design (TDP), Jun. 12, 2002, pp. 1-22.*

Media Renderer:1 Device Template Version 1.01, Jun. 25, 2002, p. 1-12.*

Office Action from the Japanese Patent Office dated Jan. 18, 2011 in a counterpart application No. 2007-008175.

* cited by examiner

```
<Event xmlns=" urn:schemas-upnp-org:metadata-1-0/AVT_RCS">
        <InstanceID val=" 0" >
                <Brightness val=" 36" />
                <Contrast val=" 54" />
                ...
        </InstanceID>
</Event>
```

| AV SESSION IDENTIFIER | TITLE | DATE | PLAY-POSITION | VOLUME |
|---|---|---|---|---|
| 1 | Matrix Revolution | 2005/09/05 13:20 | 1:20:04 | 25 |
| 2 | Star Wars II | 2005/09/03 12:05 | 00:20:35 | 23 |
| 3 | Lion King | 2005/09/04 20:20 | 00:56:21 | 15 |

METHOD OF RESTORING AV SESSION AND A CONTROL POINT FOR THE SAME

CROSS-REFERENCE TO RELATED APPLICATION

This application claims priority from Korean Patent Application No. 10-2006-0009343, filed on Jan. 31, 2006, in the Korean Intellectual Property Office, the disclosure of which is incorporated herein by reference in its entirety.

BACKGROUND OF THE INVENTION

1. Field of the Invention

The present invention relates to an AV system and, more particularly, to a method of restoring an AV session and a control point for performing the same.

2. Description of the Related Art

A home network includes various network devices such as intelligent products, wireless devices, and computing devices, which enable a user to control the various network devices as a single connected network. Network devices composing a home network provide services using middleware creating a virtual distributed computing environment. Middleware such as a home AV interoperability (HAVi), an universal plug and play control device (UPnP), a Java intelligent network infra structure (Jini), and an open services gateway initiative (OSGi) have been used to date.

In a home network, a user can receive various AV services such as movies, music, and photo-printing. A UPnP control point, controlling an AV device, and a method of connecting a device connected to an IEEE 802 network and a device connected to the IEEE 1394 network through a UPnP device functioning as a bridge are disclosed in Japanese Unexamined Patent No. 10-2003-046535: "An Information Processing Apparatus and Method, Recording Medium, and Program", which enable a user to use media at home regardless of location.

If content playing on an AV system is abnormally stopped because an error occurs in the AV system, several steps need to be performed by a user to restore the AV system. To play the stopped content, for example, the user searches for the content being played, and requests playing of the found content. To play the content from the stopped point, the user has to directly search for the part, checking a playing-state of the content by relying on his or her memory. Also, the user must directly reset the volume and brightness, which is inconvenient.

SUMMARY OF THE INVENTION

In view of the above, it is an aspect of the present invention to easily restore a lost AV session.

This and other aspects, features and advantages of the present invention will become clear to those skilled in the art upon review of the following description, attached drawings and appended claims.

According to an aspect of the present invention, there is provided a method of restoring an AV session, the method including collecting AV session information, and restoring the AV session based on the collected AV session information when an error occurs in the AV session.

According to another aspect of the present invention, there is provided a control point including an information-collecting module that collects AV session information, and a restoration module that restores the AV session based on the collected AV session information when an error occurs in the AV session.

BRIEF DESCRIPTION OF THE DRAWINGS

The above and other features and advantages of the present invention will become apparent by describing in detail exemplary embodiments thereof with reference to the attached drawings, in which.

DETAILED DESCRIPTION OF THE INVENTION

Figure 1:
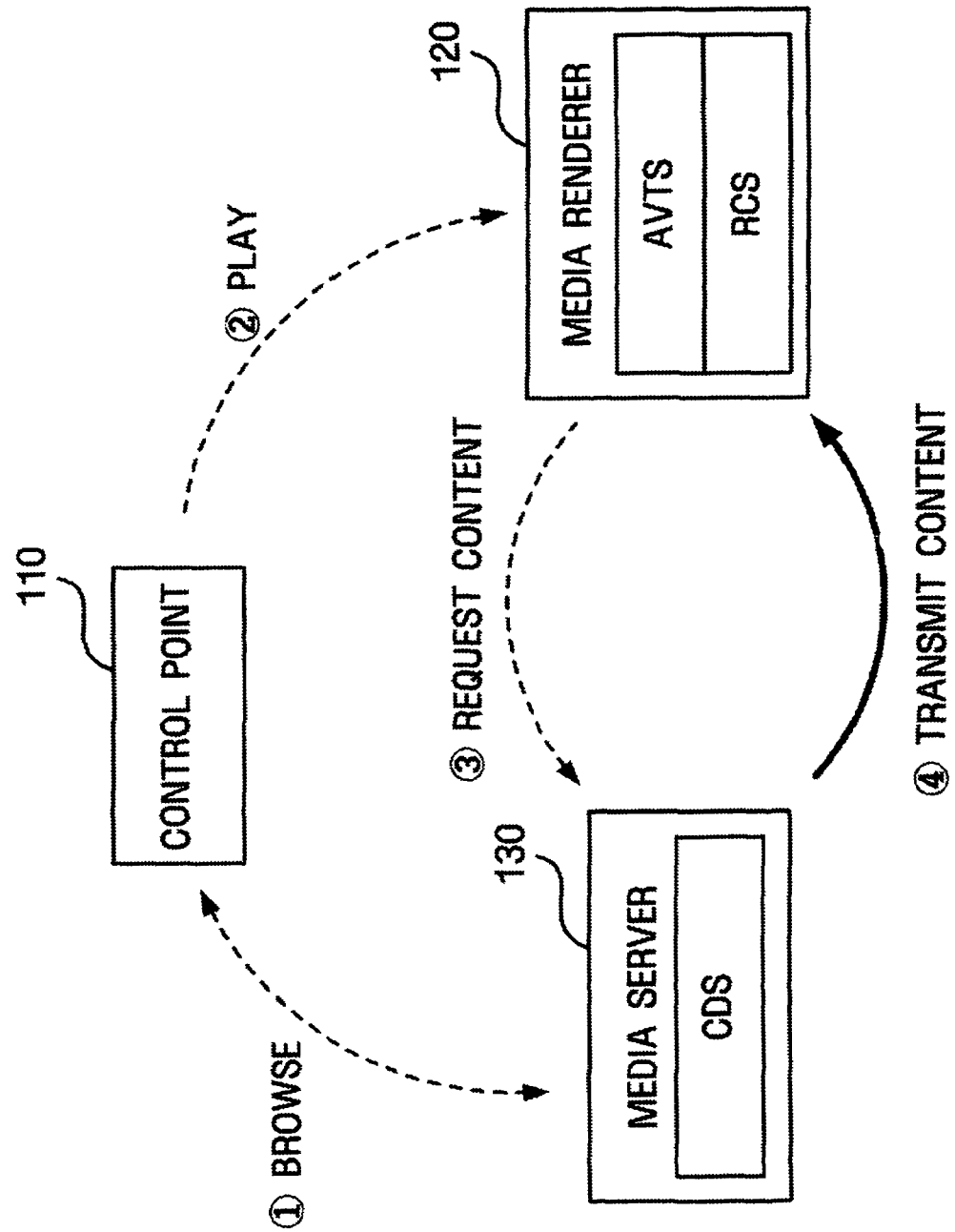
FIG. 1 depicts a UPnP AV system according to an exemplary embodiment of the present invention.

Advantages and features of the aspects of the present invention and methods of accomplishing the same may be understood more readily by reference to the following detailed description of exemplary embodiments and the accompanying drawings. The aspects of the present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Before the detailed description is set forth, terms used in this specification will be described briefly. Description of terms is provided for a better understanding of the specification, and terms that are not explicitly defined herein are not intended to limit the broad aspect of the invention.

Media Data

Media data includes videos, images, audio, and text. Media data can be in various formats such as movies, music, photos, and games.

Media Server

A media server includes a storage medium, such as a flash memory, and therefore it can store media data, and then provide the stored media data to another device. Examples of such an AV server are a personal video recorder (PVR) and a personal computer (PC).

Media Renderer

A media renderer can receive content from the media server, and play the content. Examples of such media renderers are a digital TV, a portable multimedia player (PMP), and an audio system.

Control Point

A control point can control the media server and the media renderer. A user can manage a UPnP AV system through the control point.

AV Session

An AV session is a logical connection unit between devices for playing content. Through the media server and the media renderer, when one set of content is played, one AV session is formed. When two sets of content are played, two AV sessions are formed.

AV Session Information

AV session information includes details of a normal AV session. The AV session information includes information on the media server and the media renderer that form the AV session, a uniform resource identifier (URI) of the content played in the AV session, and playing-environment-information of the AV session. The information on the media server and the media renderer includes identifiers of the media server and the media renderer. The playing-environment information includes state variables of the AV transport service (AVTS), such as, playing-position information of content and state variables of the rendering control service (RCS), such as, volume, brightness, and contrast.

Terms used in this specification, including the above-described terms, can be clearly understood with reference to UPnP standards related with an AV system, such as, UPnP AV Architecture: 0.83, MediaRenderer:1 Device Template Version 1.01, MediaServer:1 Device Template Version 1.01, ConnectionManager:1 Device Template Version 1.01, AVTransport:1 Device Template Version 1.01, RenderingControl:1 Device Template Version 1.01, and ContentDirectory:1 Device Template Version 1.01. The above standards are provided for a better understanding of the specification, and are not intended to limit the broad aspect of the invention. For reference, documents for the standards are provided by the website www.upnp.org. Hereinafter, exemplary embodiments of the present invention will be described in detail with reference to the accompanying drawings.

FIG. 1 depicts a UPnP AV system according to an exemplary embodiment of the present invention.

A UPnP AV system includes a control point 110, a media renderer 120, and a media server 130.

In FIG. 1, the control point 110, the media renderer 120, and the media server 130 are depicted as respective devices, which is merely exemplary. According to an exemplary embodiment, at least two of the devices may be integrated as a single device. For example, the control point 110 and the media renderer 120 may be embodied as a single device.

According to an exemplary embodiment, a single UPnP AV system may include one or more control points, media renderers, and media servers.

The media server 130 supports a content directory service (CDS). The CDS enables the control point 110 to search for and manage content stored in the media server 130. The CDS defines various actions; for example, Browse, Search, and CreateObject. Browse and Search may be used when the control point 110 searches for the content stored in the media server 130. CreateObject may be used when the control point 110 stores content or AV session information in the media server 130.

The media renderer 120 supports AVTS and RCS. The AVTS enables the control point 110 to control the content playing of the media renderer 120. For this, the AVTS defines various actions, for example, Play, Stop, and Seek. Play and Stop may be used to play or stop playing the content. Seek may be used to seek a specific content-playing-position in a visual point. The RCS enables the control point 110 to control a content-providing environment of the media renderer 120. Examples of the content-providing environment may be brightness, contrast, and volume. The RCS supports various actions used to control the content-providing environment.

To briefly describe an operation of a UPnP AV system, if the control point 110 requests searching of the content stored in the media server 130 using Browse, the media server 130 provides the XML document, including information on the content stored in the media server 130 in operation ①. The information on content may include a content title, a content creator, and a URI.

When a user selects desired content through information on content, the control point 110 requests the media renderer 120 to play the corresponding content in operation ②. The URI of the selected content is transmitted from the control point 110 to the media renderer 120.

The media renderer 120 requests the content from the media server 130 in operation ③. To request the content, the HTTP Get message and the URI transmitted by the control point 110 may be used.

The media server 130 transmits the requested content requested from the media renderer 120 in operation ④. The content-transmitting method between the media server 130 and the media renderer 120 is not limited UPnP; another protocol may be used.

The media renderer 120 plays content transmitted by the media server 130.

The control point 110 collects AV session information while the media renderer 120 is playing the content. The collected AV session information may be stored in the control point 110 or the media server 130. The stored AV session information will be used when an AV session is restored. AV session information and an AV session restoration will be described in detail in the following.

Figure 2:
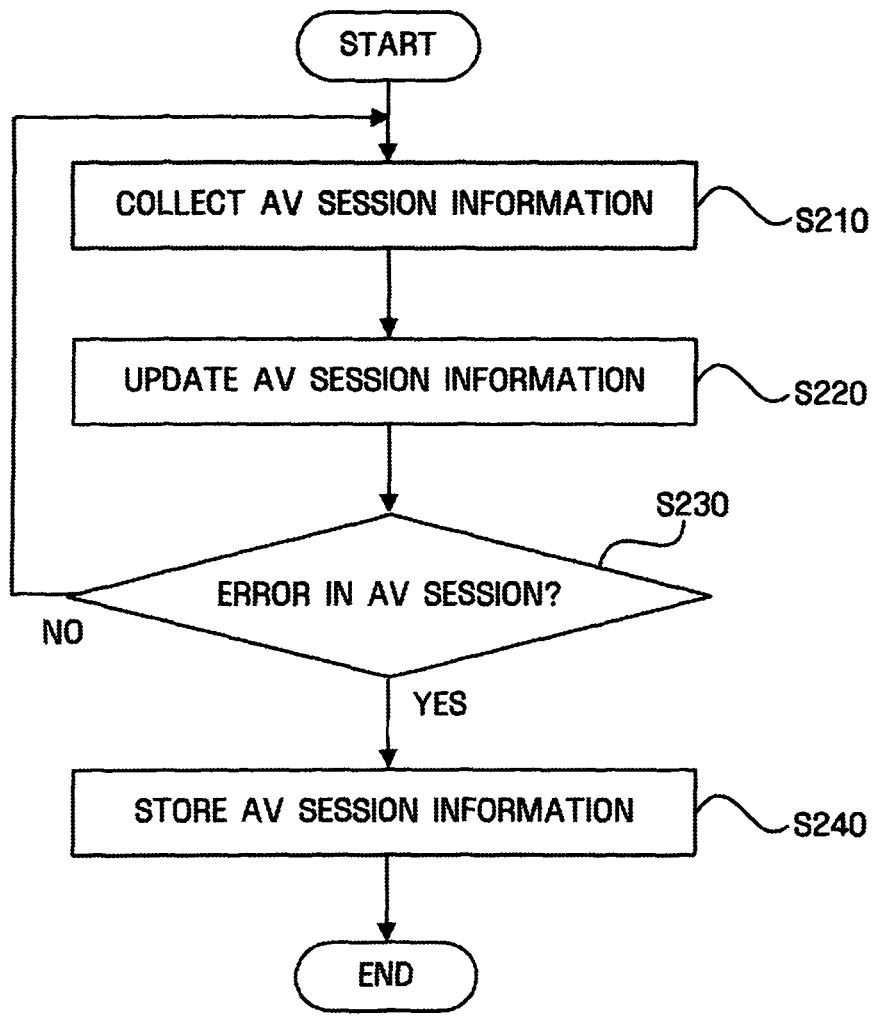
FIG. 2 is a flowchart illustrating a process of storing AV session information according to a first exemplary embodiment of the present invention.

FIG. 2 is a flowchart illustrating a process of storing AV session information according to a first exemplary embodiment of the present invention. The flowchart is described based on the control point 110.

When the control point 110 searches the media server for content, and requests the media renderer 120 to play a specific content, the media renderer 120 plays the content by streaming content from the media server 130. While the content is being played, the control point 110 collects the AV session information in S210. The AV session information may be obtained from the media renderer 120. The AV session information may be obtained by an event message transmitted by the media renderer 120 or by a request of the control point 110, which will be described with reference to FIGS. 3 through 5.

The media renderer 120 may transmit various event messages to the control point 110. When the state of the media renderer 120 is changed, the event message includes information on the changed state. Accordingly, if the state of the media renderer is changed as illustrated in FIG. 3, S310, the media renderer 120 transmits the event message including the information on the changed state to the control point 110 in S320.

Here, the event message does not always include the AV session information. Accordingly, the control point 110 chooses the AV session information of the event messages received from the media renderer 120 in S330.

Figures 3, 4:
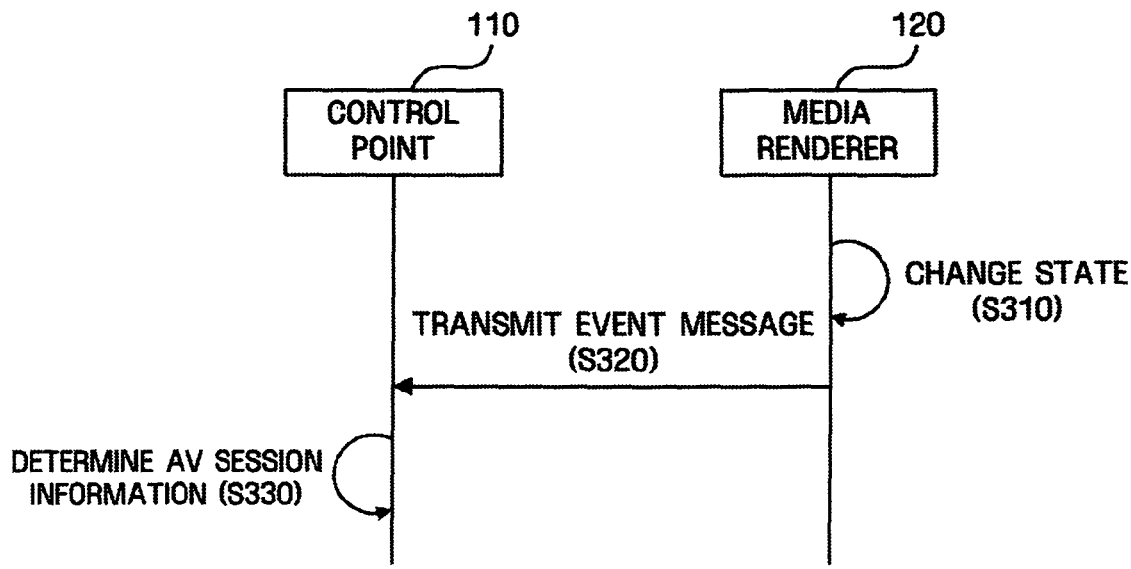
FIG. 3 is a flowchart illustrating a process of collecting AV session information according to a first exemplary embodiment of the present invention.
FIG. 4 illustrates an event message according to a first exemplary embodiment of the present invention.

As an example of changing a state of the media renderer 120, which was omitted in FIG. 3, the control point 110 requests the media renderer 120 to change the state variables of the AVTS and RCS. If the control point 110 requests to change a content-playing environment such as volume, brightness, and contrast, the media render 120 transmits an event message, which is depicted in FIG. 4, to the control point 110. In FIG. 4, the event message shows that brightness and contrast settings, of content-playing environments of the AV session in which an instance ID is "0" (more particularly, state variables of the RCS), are changed to 36 and 54, respectively. Various event models may exist, which is described in detail in UPnP's AVTransport:1 Service Template Version 1.01 and Rendering Control:1 Service Template Version 1.01.

Figure 5:
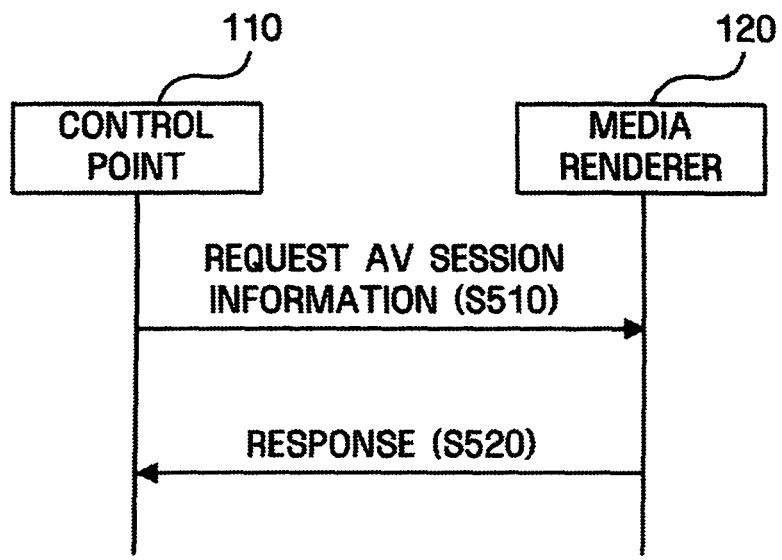
FIG. 5 is a flowchart illustrating a process of collecting AV session information according to another exemplary embodiment of the present invention.

In case of AV session information that cannot be obtained through the event message, the control point 110 requests information from the media renderer 120 in S510. The control point 110 obtains the information by receiving the corresponding response from the media renderer 120 in S520. Information on a content-playing position defined in AVTrasnsport:1 Service Template Version 1.0 is RelativeTimePosition, AbsoluteTimePosition, RelativeCounterPosition, and AbsoluteCounterPosition. The content-playing information is not transmitted through the event message. To obtain information on the content-playing position, the control point 110 may use a GetPositionInfor action in S510 of FIG. 5. Preferably, the control point 110 periodically requests the AV session information from the media renderer 120 as illustrated in FIG. 5.

Identifiers of the media renderer 120 and the media server 130, and a URI of the content, of the AV session information, may be obtained when the AV session is established.

Referring back to FIG. 2, when new AV session information is collected, the control point 110 updates the AV session information collected in advance by reflecting the collected new AV session information in S220.

The control point 110 determines whether an error has occurred in the AV session in S230. If the AV session error does not occur, steps S210 and S220 are repeated.

If the AV session cannot be normally maintained because an error occurs in the AV session, the control point 110 stores the most recently updated AV session information in S240.

Figure 6:
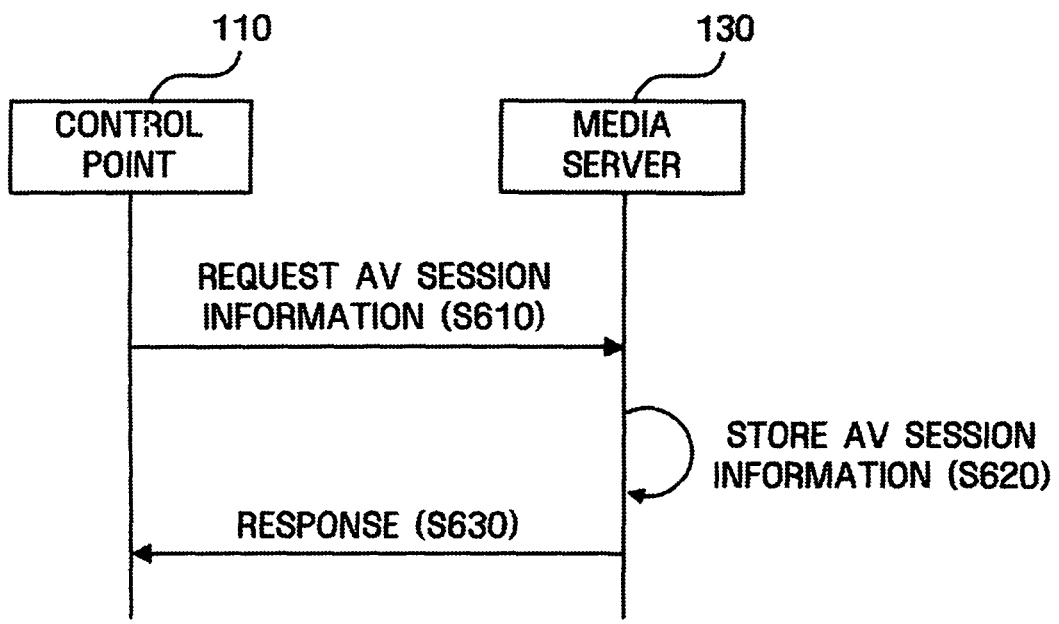
FIG. 6 is a flowchart illustrating a process of storing AV session information in a media server.

In S240 of FIG. 2, the AV session information is stored in the control point 110. According to another exemplary embodiment, however, the control point 110 stores the AV session information in the media server 130, which is illustrated in FIG. 6. When the control point 110 transmits the AV session information with a request to store the information in the media server 130, the media server 130 stores the transmitted AV session information in S620, and transmits the corresponding response message to the control point 110 in S630. To request storage of the AV session information, the control point 110 may use a CreatObject action and a CreateReference action of the CDS. The media server 130 may store the AV session information in a upnp:desc element. If the UPnP AV system is under an UPnP bookmark rule, the AV session information may be stored in the media server 130 as a bookmark-item type.

If the AV session information is stored by the operation illustrated in FIGS. 2 through 6, even though the content-playing operation is abnormally stopped because an error has occurred in the AV session, the AV session can be restored.

Hereinafter, an AV session restoration operation will be described with reference to FIGS. 7 through 10.

Figure 7:
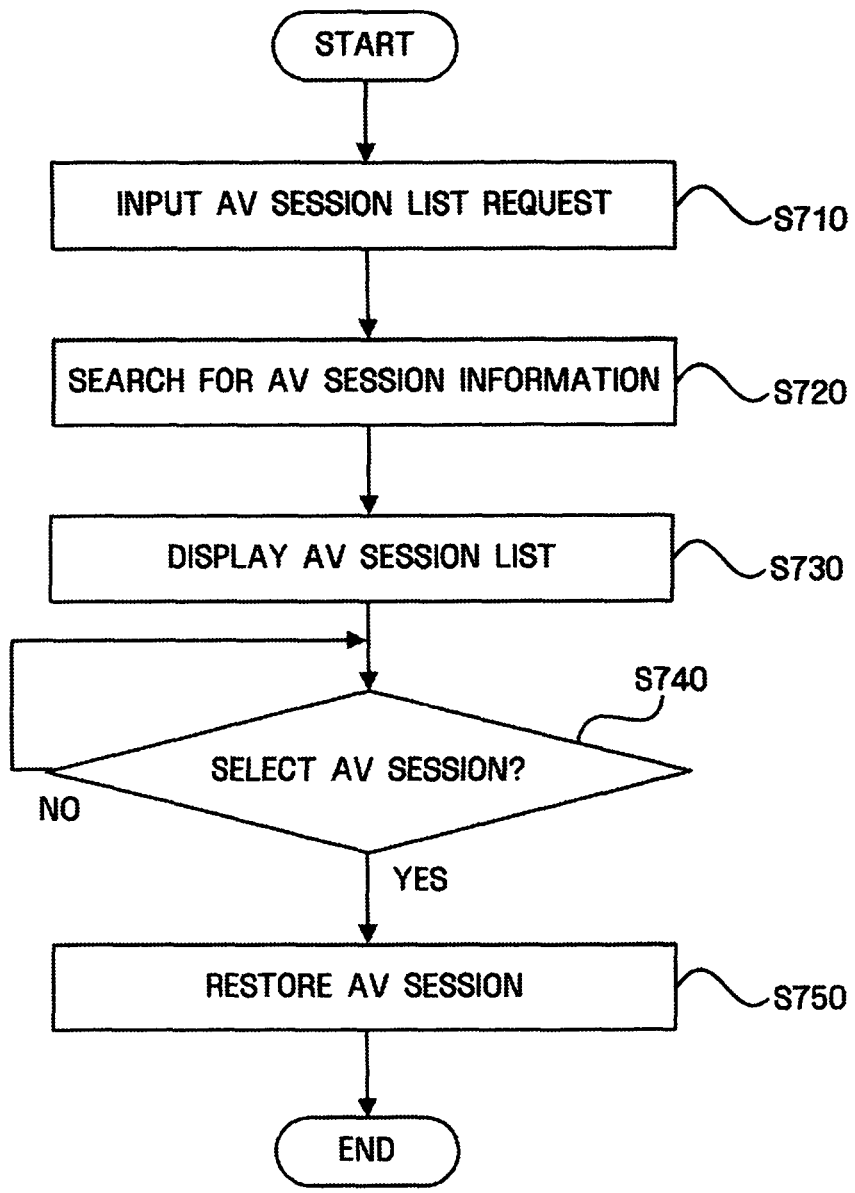
FIG. 7 is a flowchart illustrating a method of restoring AV session according to an exemplary embodiment of the present invention.

FIG. 7 is a flowchart illustrating a method of restoring AV session according to an exemplary embodiment of the present invention. The illustrated flowchart is described based on the control point 110.

After the content playing is abnormally stopped because an error has occurred in the AV session, if a request for an AV session list is input by a user S710, the control point 110 searches for the AV session information stored when the error occurs S720.

If storing the AV session information in the media server 130 as described with reference to FIG. 6, the control point 110 may search for the AV session information in the media server 130. For example, the control point 110 requests the AV session list from the media server 130 in S810. The media server 130 may transmit the AV session information stored in advance to the control point 110 as the corresponding response to the request from the control point 110 in S820. To request the AV session list, the control point 110 may use the Browse action.

Figures 8, 9:
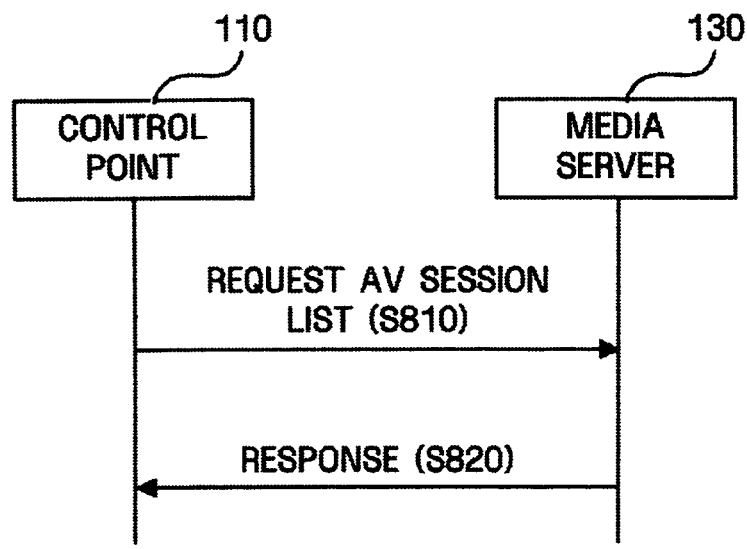
FIG. 8 is a flowchart illustrating a process of searching for an AV session list according to an exemplary embodiment of the present invention.
FIG. 9 illustrates an AV session list according to an exemplary embodiment of the present invention.

Referring to FIG. 7, the control point 110 displays the found AV session list to a user in S730. In S730, the AV session list displayed by the control point 110 may include all or some of the AV session information stored in each AV session, an example of which is illustrated in FIG. 9. The identifier of AV session lost because of an error 910, titles of content 920 that were being played in each AV session, the date when each AV session is lost 930, a content-playing position of the time when the AV session is lost 940, and a sound set when the AV session is lost 950 are in an exemplary embodiment of the present invention of FIG. 9.

A user may select a desired AV session in the AV session list displayed by the control point 110. If a specific AV session is selected by the user in S740, the control point 110 performs an AV session restoration using the AV session information of the selected AV session in S750. Accordingly, the AV session, including a URI of content, a content-playing position, and information on other content-playing environments, which are included in the AV session information selected by a user, is restored.

Figure 10:
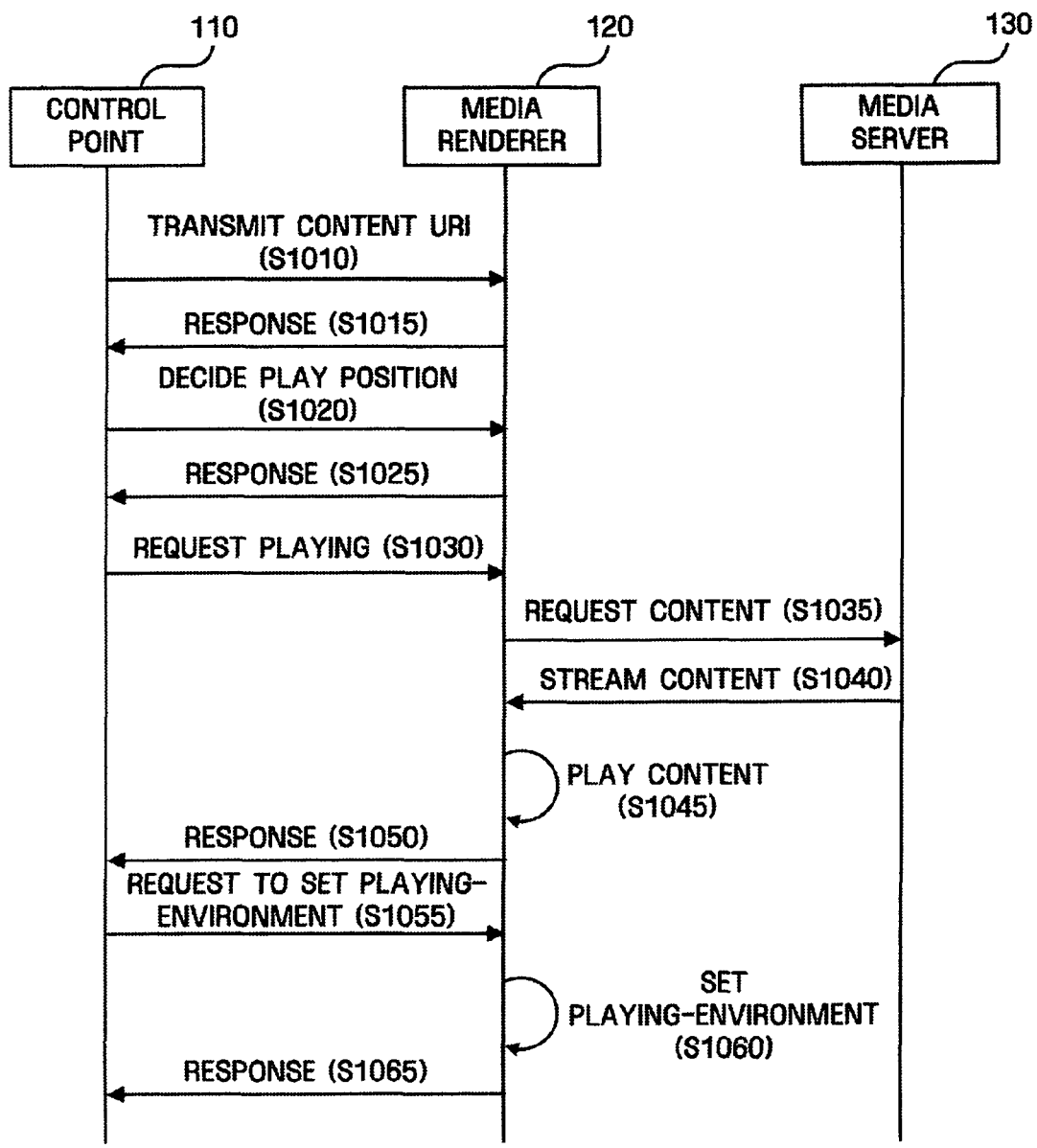
FIG. 10 is a flowchart illustrating an AV session restoration according to an exemplary embodiment of the present invention.

FIG. 10 illustrates an exemplary embodiment of the AV session restoration described in S750 of FIG. 7.

The control point 110 obtains a URI of content in the AV session information of the AV session selected by a user, and transmits it to the media renderer 120 in S1010. For this, the SetAVTransportURI action may be used. The media renderer 120 transmits the corresponding response in S1015.

The control point 110 may connect to the media renderer 120, which is not shown in FIG. 10, before URI information of content is transmitted. For example, the control point 110 may call PrepareForConnection action before calling SetAVTransportURI action. If a plurality of media renderers are in the UPnP system, the control point 110 may decide on the media renderer to be connected through a media renderer identifier that is included in the AV session information of the AV session selected by a user.

When a response for the SetAVTransportURI action from the media renderer 120 is received, the control point 110 may determine a content-playing position to the media renderer 120 using information on the content-playing position, which is obtained by the AV session information in S1020. To determine the content-playing position, the Seek action may be used. As described with reference to FIG. 6, if the UPnP system is under the UPnP bookmark agreement, the control point 110 may request the media renderer 120 to set a state variable related with the AVTS in the AV session information of the AV session selected in S740 of FIG. 7. In this case, the SetStateVariable action of the AVTS may be used.

When the response of the media renderer 120 is received in S1025, the control point 110 requests playing of content in S1030.

The media renderer 120 requests the media server 130 to transmit content using the received URI and the content-playing position in S1035.

The media server 130 streams the content requested by the media renderer 120 in S1040. The media server 130 transmits the requested content from a part corresponding to the content-playing position.

The media renderer 120 plays the content that is being streamed by the media server 130 in S1045, and then transmits a response to the play request to the control point 110 in S1050.

The control point 110 may request the media renderer 120 to set information on other playing-environments of the AV session information of the AV session selected in S740 of FIG. 7 in S1055. The playing-environment information is a state variable related with the RCS, such as volume, brightness, and contrast. The control point 110 may use SetStateVariable action of the RCS in S11055.

The media renderer 120 sets the playing-environment using the state variable provided by the control point 110 S1060, and then transmits the corresponding response to the control point 110 S1065.

Processes of FIG. 10 may be automatically performed by the control point 110 without a user's involvement.

Hereinafter, a configuration of the control point 110 that performs the above operations will be described with reference to FIG. 11.

Figure 11:
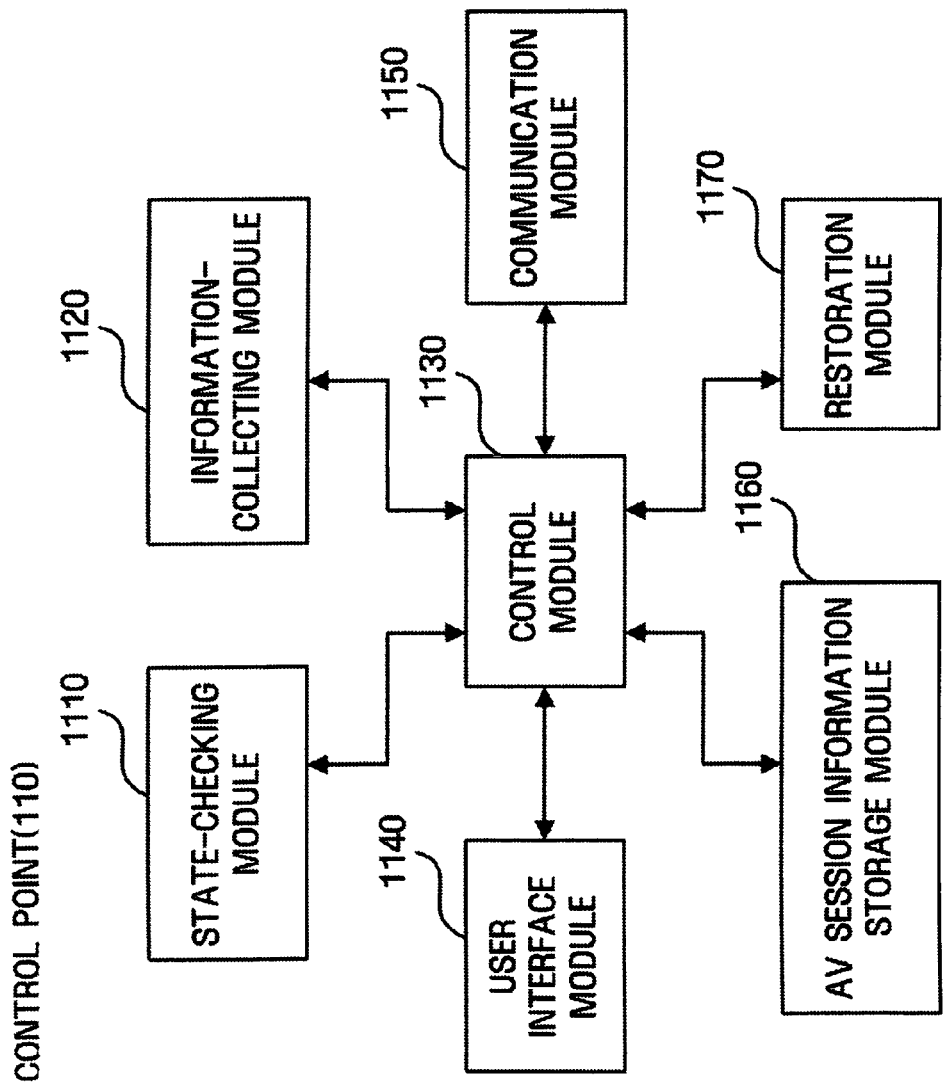
FIG. 11 is a block diagram illustrating a control point 110 according to an exemplary embodiment of the present invention.

FIG. 11 is a block diagram illustrating a control point 110 according to an exemplary embodiment of the present invention. The illustrated control point 110 includes a state-checking module 1110, an information-collecting module 1120, a control module 1130, a user interface module 1140, a communication module 1150, an AV session information storage module 1160, and a restoration module 1170.

The state-checking module 1110 checks a state of the AV session in order to determine whether to store the AV session information. That is, the state-checking module 1110 checks whether an error has occurred in the AV session. The AV session error comprises a state where the playing content cannot be performed in the AV session.

The AV session error may occur when the media renderer 120 or the media server 130 are abnormally stopped, when an inside error, such as, a hardware error and a software error of the media renderer 120 or the media server 130 occurs, or when an AV network is unstable.

The state-checking module 1110 may determine that an error has occurred in the AV session when receiving an error-event message from the media renderer 120 or the media server 130, or when receiving a disconnection message (e.g., a "goodbye" message) from the media renderer 120 or the media server 130 in a state where the playing content is not stopped or where a request for stopping the playing content has not been input by a user.

The information-collecting module 1120 collects the AV session information. When collecting new AV session information, the information-collecting module 1120 updates the pre-collected AV session information. The information-collecting module 1120 stores the latest-updated AV session information in the AV session information storage module 1160 or the media server 130 when an error occurs in the AV session. The detailed operation of the information-collecting module 1120 can be understood with reference to FIGS. 2 through 6. Messages and actions needed to collect or store the AV session information may be called via the control module 1130, which is exemplary. The information-collecting module 1120 can generate and manage the messages and actions needed to collect or store the AV session information.

The control module 1130 controls an operation of the control point 110. The control module 1130 can generate and manage the messages and actions needed to needed to communicate with the media renderer 120 and the media server 130.

The user interface module 1140 receives a control instruction from a user, and provides the user with an operation-result of the control point 110. The user interface module 1140 may include an input device such as a keypad, a touch-pad, or a touch-screen and a display device such as liquid crystal display (LCD), plasma display panel (PDP), and organic electroluminescence.

The communication module 1150 connects the control point 110 with other devices. That is, the communication module 1150 communicates with the media renderer 120 and the media server 130.

The AV session information storage module 1160 stores the AV session information. If the AV session information is stored in the media server 130 as described with reference to FIG. 6, the control point 110 may not include the AV session information storage module 1160.

The restoration module 1170 performs restoration of the AV session. An operation of the restoration module 1170 can be understood with reference to FIGS. 7 through 10. Messages and actions needed to restore the AV session may be called via the control module 1130, which is exemplary. The restoration module 1170 can generate and manage the messages and actions needed to needed to restore the AV session.

The term "module," as used herein, refers to, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, components and modules may be implemented so as to reproduce one or more CPUs within a device or a secure multimedia card.

The AV system based on the UPnP was described, but the present invention is not limited thereto. The present invention may also be applied to AV systems based on other middleware, which is included in the scope of the invention.

As described above, the AV session restoration method and the control point for the same according to the present invention can easily restore the AV session when playing content is abnormally stopped because an error occurs in the AV session.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of restoring an AV session, the method comprising:
   collecting, by a control point, AV session information, by periodically requesting the AV session information from a media renderer;
   restoring, by the control point, the AV session based on the collected AV session information when an error occurs in the AV session; and
   streaming content corresponding to the AV session from a media server to the media renderer during a playback of the content in the media renderer, and performing the collecting of the AV session information from the media renderer while the media renderer plays the content during the playback,
   wherein the collected AV session information comprises a volume state, a brightness state and a contrast state set within the media renderer during the playback of the content, and
   during the restoring, the control point restores a state of the media renderer to a most recent volume state, a most recent brightness state and a most recent contrast state collected prior to the error,
   wherein the restoring comprises requesting the media renderer, which is identified through the collected AV session information, to play content in the AV session, which is identified through a URI of the content obtained by the collected AV session information, from a content-playing position obtained by the collected AV session information,
   wherein the error occurs in the. AV session when at least one of an error-event message is received from at least one of the media renderer and the media server, and when a disconnection message is received from at least one of the media renderer and the media server in a state of at least one of the playing of content is not stopped and a request for stopping the playing of content is not input by a user.

2. The method of claim 1, wherein the AV session is a playing unit of content where the content streamed from the media server is normally played.

3. The method of claim 1, wherein the collected AV session information comprises identifiers of the media renderer and the media server, which composes the AV session, a uniform resource identifier (URI) of the content played in the AV session, and information on playing-environment information of the content.

4. The method of claim 3, wherein the playing-environment information comprises information on a content-playing position.

5. The method of claim 3, wherein the playing-environment information comprises at least one of AV transport service (AVTS) state variables and rendering control service (RCS) state variables of UPnP environment.

6. The method of claim 1, wherein the collecting of AV session information comprises:
   receiving a predetermined event message from the media renderer that composes the AV session; and
   obtaining the AV session information from the event message.

7. The method of claim 1, wherein the collecting the AV session information comprises:
   requesting the AV session information that composes the AV session from the media renderer; and
   receiving the AV session information from the media renderer.

8. The method of claim 1, further comprising storing the collected AV session information in the media server that composes the AV session.

9. The method of claim 1, wherein the restoring further comprises requesting the media renderer to set a content-playing environment obtained by the collected AV session information collected by the control point during the collecting of the AV session information from the media renderer.

10. The method of claim 3, wherein the playing-environment information of the content includes at least one of a volume, a brightness and a contrast of the media renderer.

11. The method of claim 6, wherein the predetermined event message comprising the AV session information is automatically transmitted from the media renderer to the control point when a state of the media renderer is changed, the state of the media renderer including at least one of a volume, a brightness and a contrast of the media renderer.

12. The method of claim 9, wherein the content-playing environment includes a state of the media renderer when the error occurred, the state of the media renderer including a volume, a brightness and a contrast set within the media renderer.

13. The method of claim 1, further comprising:
   generating an AV session list comprising AV sessions which have been abnormally stopped during playback as a result of the error;
   when the error occurs during the playback, storing, by the control point, the collected AV session information of the AV session corresponding to the error, and adding the AV session corresponding to the error to the AV session list; and
   displaying the AV session list on a display upon receiving a request.

14. The method of claim 1, wherein, when the error occurs, the playback of the content terminates immediately and the control point receives an error message indicating that the playback of the content has been terminated abnormally.

15. The method of claim 1, wherein the collected AV session information comprises a content-playing position of the content being played, and
   during the restoring, the control point restores the AV session such that the playback of the content corresponding to the AV session is restored to a most recent content-playing position collected prior to the error.

16. A control point comprising:
   an information-collecting module that collects AV session information by periodically requesting the AV session information;
   a restoration module that restores an AV session based on the collected AV session information when an error occurs in the AV session; and
   a control module that configures a media server and a media renderer to stream content corresponding to the AV session from the media server to a media renderer during a playback of the content in the media renderer, and the information-collecting module collects the AV session information from the media renderer while the media renderer plays the content during the playback,
   wherein the collected AV session information comprises a volume state, a brightness state and a contrast state set within the media renderer during the playback of the content, and
   during the restoring, the restoration module restores a state of the media renderer to a most recent volume state, a most recent brightness state and a most recent contrast state collected prior to the error, wherein the restoration module requests the media renderer, which is identified through the collected AV session information, to play content in the AV session, which is identified through a URI of the content obtained by the collected AV session information, from a content-playing position obtained by the collected AV session information, and wherein the error occurs in the AV session when at least one of an error-event message is received from at least one of the media renderer and the media server, and when a disconnection message is received from at least one of the media renderer and the media server in a state of at least one of the playing of content is not stopped and a request for stopping the playing of tent is not input by a user.

17. The control point of claim 16, wherein the AV session is a playing unit of content where the content streamed from the media server is normally played.

18. The control point of claim 16, wherein the collected AV session information comprises identifiers of the media renderer and the media server, which composes the AV session, a uniform resource identifier (URI) of the content played in the AV session, and a playing-environment information of the content.

19. The control point of claim 18, wherein the playing-environment information comprises information on a content-playing position.

20. The control point of claim 18, wherein the playing-environment information comprises at least one of AV transport service (AVTS) state variables and rendering control service (RCS) state variables of a UPnP environment.

21. The control point of claim 16, wherein the information-collecting module obtains the AV session information from an event message when a predetermined event message is received from the media renderer that composes the AV session.

22. The control point claim 16, wherein the information-collecting module receives the AV session information from the media renderer after requesting the AV session information from the media renderer that composes the AV session.

23. The control point of claim 16, wherein the information-collecting module requests storage of the collected AV session information in the media server that composes the AV session.

24. The control point of claim 16, wherein the restoration module requests the media renderer to set a content-playing environment obtained by the collected AV session information.

25. The control point of claim 16, wherein, when the error occurs, the playback of the content terminates immediately and the control point receives an error message indicating that the playback of the content has been terminated abnormally.

26. The control point of claim 16, wherein the collected AV session information comprises a content-playing position of the content being played, and during the restoring, the restoration module restores the AV session such that the playback of the content corresponding to the AV session is restored to a most recent content-playing position collected prior to the error.

* * * * *